(12) United States Patent
Ramarao et al.

(10) Patent No.: US 7,890,999 B2
(45) Date of Patent: Feb. 15, 2011

(54) RPC PORT MAPPER INTEGRITY CHECKER TO IMPROVE SECURITY OF A PROVISIONABLE NETWORK

(75) Inventors: Guruprasad Ramarao, Sunnyvale, CA (US); Amit Raikar, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1626 days.

(21) Appl. No.: 10/637,172

(22) Filed: Aug. 7, 2003

(65) Prior Publication Data

US 2005/0033986 A1 Feb. 10, 2005

(51) Int. Cl.
*G08B 23/00* (2006.01)

(52) U.S. Cl. ............... 726/22; 726/2; 726/3; 726/4; 709/223; 709/224

(58) Field of Classification Search .................. None
See application file for complete search history.

(56) References Cited

U.S. PATENT DOCUMENTS

| 6,134,591 | A  | * | 10/2000 | Nickles ............... 709/229 |
| 6,988,208 | B2 | * | 1/2006 | Hrabik et al. ............ 726/23 |
| 2002/0144156 | A1 | * | 10/2002 | Copeland, III .......... 713/201 |

* cited by examiner

*Primary Examiner*—Ponnoreay Pich

(57) ABSTRACT

A method for verifying port integrity in a network, comprising: accessing port binding information in a port authorization file in the network, querying a port mapper in the network for a mapped port assignment, comparing the port assignment to the port binding, and initiating a response based on the results of the comparing.

20 Claims, 3 Drawing Sheets

RPC PORT MAPPER INTEGRITY CHECKER TO IMPROVE SECURITY OF A PROVISIONABLE NETWORK

RELATED U.S. APPLICATION

This application incorporates herein by reference the co-pending patent application, filed Jan. 21, 2003, Ser. No. 10/349,385, entitled "A System For Protecting Security Of A Provisionable Network," and assigned to the assignee of the present application.

FIELD OF THE INVENTION

The present invention relates to the field of computer network security. Specifically, the present invention relates to a method and architecture for verifying port mapping integrity in a network.

BACKGROUND OF THE INVENTION

Modern networking continues to provide communication and information access increases and improvements. The continuing growth of networking systems and technology seems limitless and the speed of networked communications has brought benefits to nearly every human endeavor.

Recent trends in information technology have seen large enterprises and other users moving towards a new paradigm of network utilization, the provisionable utility data center (UDC). A provisionable data center allows a centralization of information technology (IT) services and enterprise-wide, and even internet-wide, access to specialized data and functions. The various moves to re-centralize IT systems of all kinds is driven in part by shortages in IT staff and by the intrinsic inefficiencies of distributed systems. Notably, many IT managers are migrating to a smaller number of large data centers. Enabled by abundant and relatively inexpensive network bandwidth, IT services can now be distributed to users globally. The need to nest server-side technology near the client workstation is lessening, which has led to this dramatic change in IT architecture.

This re-centralization requires greater resilience, reliability and security, since a failure of shared resources or a loss of critical data can affect an enterprise using a provisionable data center to a large degree. At the same time, though, consolidated provisionable data centers can more easily be engineered to eliminate single points of failure.

Another trend is the growing importance of third-party service providers. Networking enterprises are finding it advantageous to turn to service providers instead of bearing the cost of internal development, deployment, and maintenance of their own in-house systems. In areas such as global networking, service providers dominate in provisioning a commodity resource that enterprises could never develop individually. Storage service providers allow enterprises to cache data conveniently. A small, but growing, contingent of application service providers (ASPs) now are able to operate enterprise software systems. IT service providers are exploiting the opportunity to consolidate across enterprises, which allows them to be highly competitive with internal IT organizations.

The system management tools available to reliably operate and secure the resultant necessarily complex network systems are also emerging. Constant, dynamic, reprovisioning of resources to match shifting clients and client needs depends on a strong IT resource management foundation.

Even more than earlier distributed networks, provisionable data center networks are exposed to possible security lapse and even attack through the multitudinous communications links such systems entail. Because there is necessary communication within and between resources contained within the provisionable data center, as well as communication with users outside the network, the possible avenues of security failure are many.

In addition to the "normal" hacker attack, security breaches can consist of such things as the unauthorized entry into a portion of a database by an otherwise authorized user or the unauthorized use of an application managed by the center. An example of this could be use by a foreign engineering entity of a supercomputer computational fluid dynamics facility, perhaps barred by technology exchange law, wherein the foreign entity's use of other portions of the same provisionable data center is legitimate and desirable.

Another example involves a case wherein there are competing clients legitimately served by the UDC and who share some of the available resources, such as a marketing database. These same two clients may also employ the UDC for secure archiving of proprietary data that neither wants the other to access. Furthermore, the management system of a provisionable data center itself could be the target of a focused intrusion whose goal could be the weakening of the management structure to enable other intrusions.

An example of one avenue of a hostile attack is in the "spoofing" of a network port map to make a hostile entity appear as a legitimate port user. Another is the redirection of a port connection within the network by altering the port map resident in the network management infrastructure. The number of ports in a provisionable network can extend into the thousands, providing many opportunities for such a hostile entity to either re-direct a port assignment in the port map, or to supplant a legitimate user of a port. In either case, the hostile entity can gain unauthorized access to the network and its services.

What is needed, then, is a system and an architecture to provide security of the ports and port map in the provisionable utility data center. Such protection must be such that the legitimate users and services of the data center as well as the infrastructure of the UDC itself can be protected from intrusions that originate from an external source, or resources provisioned by the data center, that emulate or appropriate ports in the network.

SUMMARY OF THE INVENTION

Accordingly, the present invention provides a system and an method to provide security of the ports and port map in the provisionable data center, hereafter called a utility data center (UDC). The system and method presented enable the legitimate users and services of the data center, as well as the infrastructure of the UDC itself, to be protected from intrusions that originate from an external source, or resources provisioned by the data center, that emulate or appropriate ports in the network.

Disclosed is a method for verifying port mapping integrity in a network, comprising: accessing port binding information in a port authorization file in the network, querying a port mapper in the network for a mapped port assignment, comparing the port assignment to the port binding, and initiating a response based on the results of the comparing.

BRIEF DESCRIPTION OF THE DRAWINGS

The operation of this invention can be best visualized by reference to the drawings.

DETAILED DESCRIPTION

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

This application incorporates herein by reference the co-pending patent application, filed Jan. 21, 2003, Ser. No. 10/349,385, entitled "A System For Protecting Security Of A Provisionable Network," and assigned to the assignee of the present application.

Figure 1:
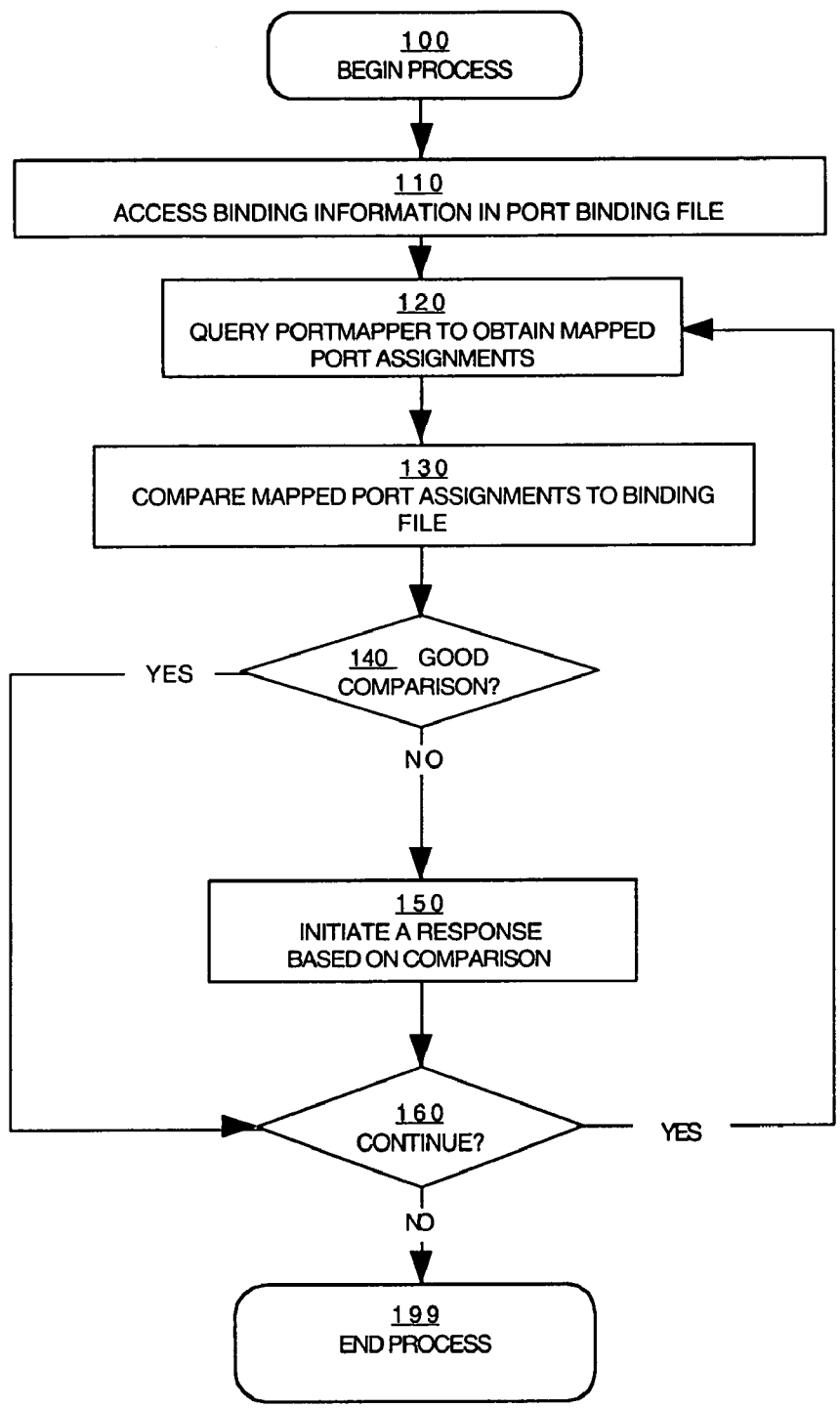
FIG. 1 illustrates a block flow diagram of a port integrity verification method in accordance with embodiments of the present invention.

FIG. 1 illustrates, in block flow format, a method for port map integrity verification in accordance with an embodiment of the present invention. Process 100, performed by a computer system, commences at 110 by accessing port binding information from a port binding file. More specifically, embodiments of the present invention access files that are established when the network system is initialized. It is noted that port binding information is established when the network is initialized and includes the permanent bindings which are those ports assigned permanently to particular services or clients. An example of a permanently assigned port is that which is assigned by convention to a peripheral, such as a printer.

Process 100 continues at 120 by querying the network management portmapper for information concerning the assignment of mapped ports. A portmapper can be resident in a server or some other storage device and maintains the current assignment of ports. A portmapper, in the implementation of networks envisioned in this discussion, is a remote procedure calling, or RPC, service.

At 130, the present embodiment compares information gathered in the portmapper query, 120, to the binding information stored in an electronic device in network management, accessed at 110. Binding information includes the permanent port assignments that are fixed by convention and agreement as well as those bindings assigned by the network management to services and clients that access the network without fixed port assignments. The binding information can also include a secure digital signature associated with each authorized service and client. In the comparison of step 130, the assignment of services and ports is compared to the stored bindings.

If, at 140, there is a miscomparison, such as a service using a port assigned to another service or a port-assigned client accessing services to which the client is not authorized, the process can generate an alert or an alarm, at 150. Embodiments of the present invention are able to generate a variety of alarms or alerts. Some of these can vary by virtue of the level of perceived threat which can be assessed by network management and established as a threat rating system. An alarm can, as an example, consist of raising a flag to notify a human manager that there is an anomaly with a port assignment. An alarm can also consist of initiating a partial or a full system lockdown, thus blocking access on a number of ports and access to some types of services normally available in the provisionable network.

At 160, If the process is to continue, it does so by again querying the port mapper for port assignment information at step 120. Querying the portmapper is, as discussed above, accomplished in a remote procedure call (RPC). Otherwise, the process can terminate at 199.

Figure 2:
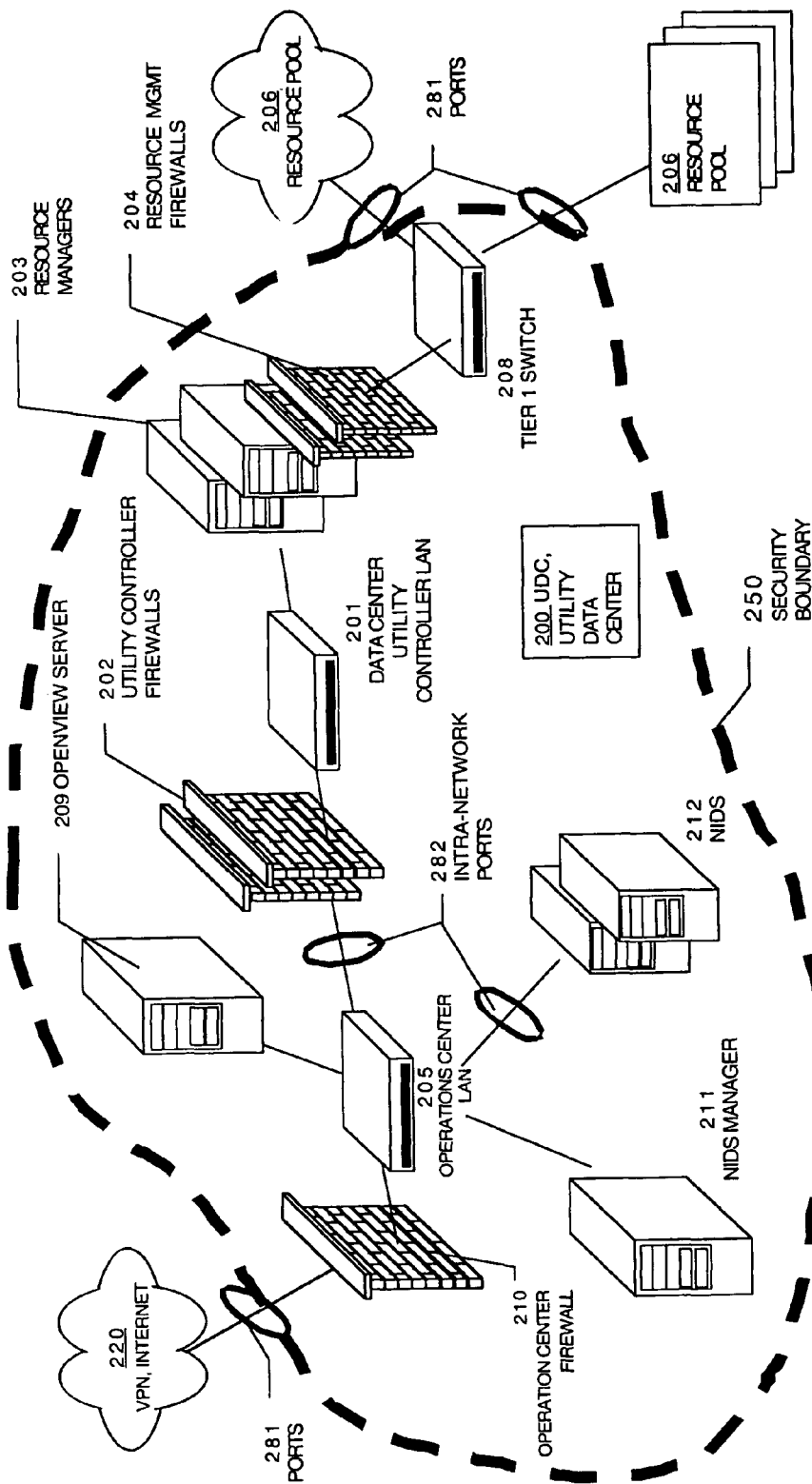
FIG. 2 illustrates a utility data center in accordance with embodiments of the present invention.

FIG. 2 illustrates an exemplary provisionable network in which embodiments of the present invention can function. Provisional network, or utility data center (UDC), 200 is shown bounded by a virtual security boundary 250. Boundary 250 is shown here only to help illuminate the concepts presented herein. Typical UDC 200 comprises an operations center local area network (LAN) 205, a data center utility controller LAN 201 and resource pools 206. It is noted here that, by their very nature, UDCs are flexible in their composition, comprising any number and type of devices and systems. It is this flexibility from which they derive their usefulness. The specific architecture illustrated in FIG. 2, therefore, is not meant to limit the application of embodiments of the present invention to any particular provisionable network architecture.

Typical UDC 200, in this illustration, communicates with the outside world via the Internet 220 and virtual public networks (VPNs) in the Internet. The communications links that enable this communication are protected by firewall 210. Firewall 210 is shown to illustrate a concept and is not meant to imply any particular method or system of intrusion protection. Many types of hardware and software firewalls are well known in the art and firewall 210 may be either or both.

It is noted here that communications into and out of a provisionable network, as in any network, is accomplished through ports such as illustrated at 281. Communications between devices within a network are also conducted through ports, as alluded to at 282. It is noted that ports are not necessarily physically located at the periphery of a network but are logical end points. External ports 281 and intra-network ports 282 are shown only to help illustrate the concepts presented in embodiments of the present invention. It is also noted that virtual security boundary 250 does not exist in a physical sense. Resources included in the servers and LANs comprising utility data center 200 may include devices and servers located remotely from the other elements of the UDC.

Firewalls 210, in many implementations of a provisionable network, evaluate a communication by its port call. If a communication is attempted using an address and a port that are, to the firewall, allowable, the communication is permitted by the firewall. A firewall typically cannot distinguish services using valid port assignments.

Embodiments of the present invention operate in an environment that distinguishes between three trust domains established in the trust hierarchy of a utility data center. One trust domain is embodied in the Operations Center (OC) LAN 205 where non-critical UDC and other operations-related functions reside. The level of trust is less than the Data Center Control LAN 201. Another trust domain is the data center controller LAN 201 where tasks relating to the automated provisioning of managed resources 206 reside. Access to the Data Center LAN 201 is severely restricted from this domain. A third domain comprises the managed resources LANs where the managed resources 206 reside. These LANs are typically not trusted. It is noted here that clients of the utility data center originate outside the above trust structure and access elements of the UDC via the Internet or a virtual private network (VPN) resident in the Internet infrastructure.

As shown in FIG. 2, operations center (OC) LAN 205 comprises an internal trust domain. Included in OC LAN 205 are manager-of-managers (MoM) server 209, network intrusion detection system (NIDS) 212 and NIDS manager 211. It is noted that, though NIDS 212, NIDS manager 211 are illustrated as computer-like devices, their physical existence is not limited to a particular device. Each may exist as a standalone device or implemented as software resident in a physical device or server.

The heart of the exemplary utility data center illustrated in FIG. 2 is the data center utility controller (UC) LAN, 201. This LAN represents another, higher, internal trust domain. UC LAN communicates through OC LAN 205 and is typically separated from it by various forms of firewalls 202. UC LAN 201 can comprise various numbers of resource managers, such as illustrated at 203. The flexibility inherent in the UDC concept can result in many combinations of resources and resource managers. Resource managers 203 are the typical interface with the various pools of resources 206, communicating with them through ports and some sort of switching network as indicated by the tier 1 switch at 208.

Resource pools 206 are limitlessly flexible, comprising any conceivable combination of data servers, computational capability, load balancing servers or any other device or capability imaginable. Because the possible varieties of resources that can be included in resource pools 206, they are separated from UC LAN 201 by firewalls 204, which, like UC firewalls 202, can be software or hardware or both, in many combinations.

Firewall 210 divides a provisionable network from the outside world which is indicated by VPN and Internet 220. As indicated by ports at 281, the provisionable network communicates through ports. It is noted that ports are not physically represented at the virtual security boundary 250 but are addresses determined by convention and the operating environment of the network's communications. However, some port address, it is noted, are fixed by convention and are universal throughout the Internet and within the networks which comprise it. Examples of fixed ports address are those of TCP TELNET (transmission control protocol) service which is available on port 23, FTP (file transfer protocol) on port 21 and SMTP (simple mail transfer protocol) on port 25. By having fixed port addresses for these services that are used millions of times every second in virtually every network throughout the world, makers of devices that connect to and employ these services can hard code the port addresses and are not required to provide the capability to dynamically seek a port address.

The port binding of a particular application, when the application is brought up, is able to be bound to a Portmapper and its services are born on a particular port. These ports are also put in a separate file on a server or other network facility, then an embodiment of the present invention can access the file and then query the Portmapper to see if that particular service is listening on that particular port.

Embodiments of the present invention are enabled to access a file, or multiple files, containing a list of port bindings and the identifiers of authorized service or client using the using the port. Then these embodiments are enabled to query the portmapper in order to verify whether the identified services are in fact using the authorized port.

It is noted that embodiments of the present invention are enabled to operate in a remote procedure calling (RPC) environment. The RPC protocol is designed to augment IP in a different way than Transmission Control Protocol (TCP). While TCP is targeted at the transfer of large data streams, as is found in a file download, for example, RPC is designed for network programming, providing a means by which an application can call a subroutine on a remote machine. It is also noted that RPC is a "request-reply" protocol. Portmapper is, in embodiments of the present invention, an RPC called application.

RPC, in implementations envisioned in these embodiments, provides support for authenticating a calling program on one device to a target subroutine on another. Authentication can operate in several different modes. It is noted that RPC allows services freedom from being tied to a given port number. It does so using a special RPC service called PORTMAP or RPCBIND. These binding protocols, often referred to as the portmapper, are unique among RPC services since they have an assigned port of their own (port 111). Other RPC services, running on any port number, can register themselves using an RPC call to port 111. The portmapper offers other RPC calls to permit service lookup. It is for this reason that a portmapper verification tool, such as provided by embodiments of the present invention, is required. It is noted that portmapper is, in networks implementing embodiments of the present invention, the first RPC program started, and remains in constant operation while the network is in operation.

It is noted that embodiments of the present invention can run in many different environments. One network management environment in which an embodiment operates serves as an end-to-end service management infrastructure and is particularly well suited to managing a provisionable network which can also be known as a utility data center (UDC).

It is also noted that each of the systems in this illustration of a network environment for embodiments of the present invention can have their software operating systems protected by "lock-down" software such that they are rendered more difficult to gain unauthorized access to. The lock-down software configuration is tailored to the individual systems. Embodiments of the present invention are enabled to initiate a lock down in the case of a compromised port.

Figure 3:
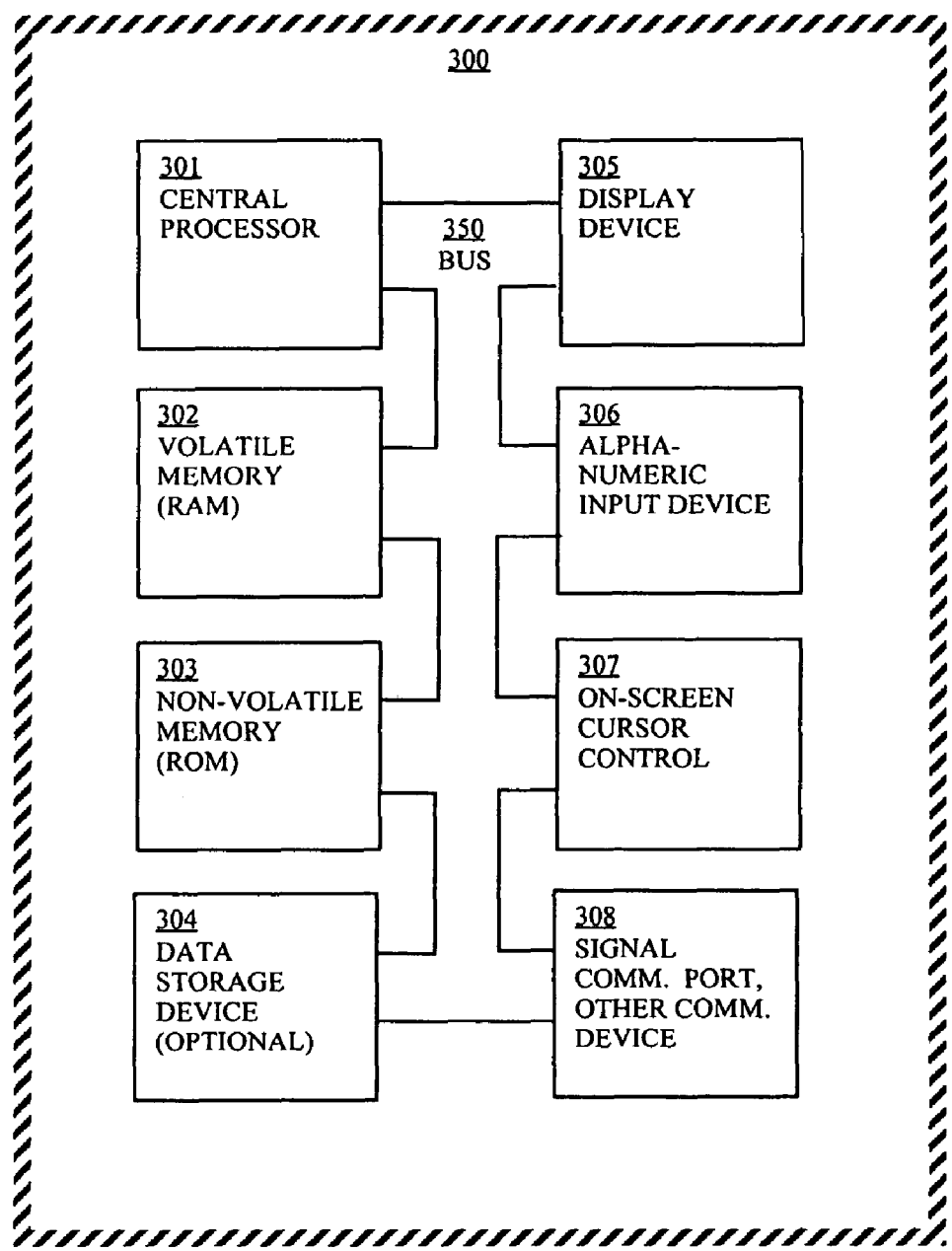
FIG. 3 illustrates a block diagram overview of generic computer system in accordance with embodiments of the present invention.

The software components of embodiments of the present invention run on computers. A configuration typical to a generic computer system is illustrated, in block diagram form, in FIG. 3. Generic computer 300 is characterized by a processor 301, connected electronically by a bus 350 to a volatile memory 302, a non-volatile memory 302, possibly some form of data storage device 304 and a display device 305. It is noted that display device 305 can be implemented in different forms. While a video CRT or LCD screen is common, this embodiment can be implemented with other devices or possibly none. System management is able, with this embodiment of the present invention, to determine the actual location of the means of output of alert flags and the location is not limited to the physical device in which this embodiment of the present invention is resident.

Similarly connected via bus 350 are a possible alpha-numeric input device 306, cursor control 307, and communication I/O device 308. An alpha-numeric input device 306 may be implemented as any number of possible devices, including video CRT and LCD devices. However, embodiments of the present invention can operate in systems wherein intrusion detection is located remotely from a system management device, obviating the need for a directly connected display device and for an alpha-numeric input device. Similarly, the employment of cursor control 307 is predicated on the use of a graphic display device, 305. Communication I/O device 308 can be implemented as a wide range of possible devices, including a serial connection, USB, an infrared transceiver, a network adapter or an RF transceiver.

The foregoing discussion of embodiments of the present invention refers often to a utility data center and to a provisionable network. It is noted that, though the dynamic nature of such networks is particularly amenable to the advantages presented in various embodiments, such networks are among many different possible applications of these embodiments. Again, embodiments of the present invention are directed to the security of network ports, whether they be in a UDC, a LAN or any other form of network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method for verifying port mapping integrity in a network, comprising:
   accessing, performed by a computer system, port binding information, which includes an identification and an authorized port of an authorized service, in a port authorization file in said network;
   querying a port mapper for a mapped port assignment, which was created when an application registered a service provided by the application with said port mapper at the time said application was brought up, said mapped port assignment includes a current port used by said registered service;
   determining if an identified service is currently using said authorized port by comparing said mapped port assignment to said port binding information; and
   initiating a response to said comparing.

2. The method described in claim 1 wherein said network comprises a utility data center.

3. The method described in claim 1 wherein said mapped port assignment comprises static port binding data.

4. The method described in claim 1 wherein said port authorization file comprises fixed port assignments.

5. The method described in claim 1 wherein said port authorization file is generated upon network initialization.

6. The method described in claim 1 wherein said response comprises an alarm.

7. The method described in claim 1 wherein said response comprises a system lockdown.

8. In a network comprising a plurality of network port connections, a network port map verification tool, comprising:
   a port assignment file, stored in an electronic device, comprising a port authorization, which includes an authorized port of an authorized service, in said network; and
   a port assignment file verifier wherein said verifier is enabled to verify a port assignment against said port authorization by,
   querying a port mapper for a mapped port assignment, which was created when an application registered a service provided by the application with said port mapper at the time said application was brought up, said mapped port assignment includes a current port used by said registered service;
   determining if an identified service is currently using said authorized port by comparing said mapped port assignment to said port authorization; and
   initiating a response to said comparing.

9. The network port map verification tool described in claim 8, wherein said network comprises a utility data center.

10. The network port map verification tool described in claim 9, wherein said network port map verification tool is further enabled to initiate a response to a port assignment anomaly.

11. The network port map verification tool described in claim 10, wherein said response is an alarm.

12. The network port map verification tool described in claim 10, wherein said response is a system lockdown.

13. The network port map verification tool described in claim 9, wherein said network port map verification tool is enabled to verify a digital signature related to said port authorization.

14. The network port map verification tool described in claim 9, wherein said network port map verification tool is enabled to operate in a remote procedure call environment.

15. A system for protecting network security, comprising:
   a network server coupled to a network;
   a network client communicatively coupled with said network server via a port;
   a plurality of provisionable services enabled to communicate with said server via a plurality of ports; and
   a port map verification tool enabled to compare a port assignment to a port authorization, which includes an authorized port of an authorized service, in said network by,
   querying a port mapper for a mapped port assignment, which was created when an application registered a service provided by the application with said port mapper at the time said application was brought up, said mapped port assignment includes a current port used by said registered service;
   determining if an identified service is currently using said authorized port by comparing said mapped port assignment to said port authorization; and
   initiating a response to said comparing.

16. The system for protecting network security described in claim 15 wherein said network comprises a utility data center.

17. The system for protecting network security described in claim 15, wherein said port map verification tool is enabled to initiate a response to a port assignment anomaly.

18. The system for protecting network security described in claim 17, wherein said response can be an alarm.

19. The system for protecting network security described in claim 17, wherein said response can be a system lockdown.

20. The system for protecting network security described in claim 17, wherein said port map verification tool is enabled to operate in a remote procedure call environment.

* * * * *